United States Patent
Franzrahe et al.

(10) Patent No.: US 12,226,749 B2
(45) Date of Patent: Feb. 18, 2025

(54) INTERNAL COOLING SYSTEM FOR FLUID-BED GRANULATION PLANTS

(71) Applicants: thyssenkrupp Fertilizer Technology GmbH, Dortmund (DE); thyssenkrupp AG, Essen (DE)

(72) Inventors: Harald Franzrahe, Dortmund (DE); Rositsa Marianova Rieks, Leverkusen (DE)

(73) Assignees: thyssenkrupp Fertilizer Technology GmbH, Dortmund (DE); thyssenkrupp AG, Essen (DE)

( * ) Notice: Subject to any disclaimer, the term of this patent is extended or adjusted under 35 U.S.C. 154(b) by 977 days.

(21) Appl. No.: 16/982,631

(22) PCT Filed: May 7, 2019

(86) PCT No.: PCT/EP2019/061739
§ 371 (c)(1),
(2) Date: Sep. 21, 2020

(87) PCT Pub. No.: WO2019/215193
PCT Pub. Date: Nov. 14, 2019

(65) Prior Publication Data
US 2021/0053884 A1 Feb. 25, 2021

(30) Foreign Application Priority Data
May 8, 2018 (EP) .................... 18171205

(51) Int. Cl.
*B01J 2/16* (2006.01)
*C05C 9/00* (2006.01)
*C05G 5/12* (2020.01)

(52) U.S. Cl.
CPC .............. *B01J 2/16* (2013.01); *C05C 9/005* (2013.01); *C05G 5/12* (2020.02)

(58) Field of Classification Search
CPC .............. B01J 2/16; C05C 9/005; C05G 5/12
(Continued)

(56) References Cited

U.S. PATENT DOCUMENTS

| 3,117,020 A | 1/1964 | Fabris |
| 3,398,191 A | 8/1968 | Thompson |

(Continued)

FOREIGN PATENT DOCUMENTS

| CA | 1101641 A | | 5/1981 |
| CN | 205872913 U | * | 1/2017 |

(Continued)

OTHER PUBLICATIONS

International Search Report issued in PCT/EP2019/061739, dated Jun. 27, 2019.

(Continued)

*Primary Examiner* — Huy Tram Nguyen
(74) *Attorney, Agent, or Firm* — thyssenkrupp North America, LLC

(57) ABSTRACT

A fluid-bed granulator system with adjustable cooling includes a fluid-bed granulator. A first cooler is externally connected to the fluid-bed granulator or forms an internal part of the fluid-bed granulator. A product screen is connected to the first cooler and the fluid-bed granulator. The product screen includes an exit for final on-size product particles, an exit for oversized particles, and an exit for undersized particles. The exit for the undersized particles is connected to the fluid-bed granulator and the exit for the oversized particles is connected to the fluid-bed granulator via one or more crushers. A recycle cooler is located and connected between the fluid-bed granulator and the exit for undersized particles and/or the recycle cooler is located between the fluid-bed granulator and the exit for the over- (Continued)

sized particles. The recycle cooler is connected to the fluid-bed granulator via one or more recycle inlets.

14 Claims, 3 Drawing Sheets

(58) Field of Classification Search
USPC .................................................. 71/8; 422/139
See application file for complete search history.

(56) References Cited

U.S. PATENT DOCUMENTS

| | | | |
|---|---|---|---|
| 4,213,924 | A | 7/1980 | Shirley, Jr. |
| 4,219,589 | A | 8/1980 | Goethals |
| 4,353,730 | A * | 10/1982 | Kinno ............... C05G 5/30 209/139.1 |
| 4,535,730 | A | 8/1985 | Allen |
| 4,701,353 | A | 10/1987 | Mutsers |
| 4,842,790 | A * | 6/1989 | Nunnelly ........... C01B 17/0237 425/222 |
| 5,779,945 | A | 7/1998 | Nijsten |
| 6,203,730 | B1 | 3/2001 | Honda et al. |
| 7,582,237 | B2 | 9/2009 | Sakata et al. |
| 8,622,325 | B2 | 1/2014 | Meessen |
| 2002/0011088 | A1* | 1/2002 | Peacock ............... C05D 9/00 71/48 |
| 2009/0301618 | A1 | 12/2009 | Visagie |
| 2011/0159180 | A1 | 6/2011 | Ledoux |
| 2015/0217248 | A1 | 8/2015 | Wang et al. |
| 2016/0115089 | A1 | 4/2016 | Wang et al. |

FOREIGN PATENT DOCUMENTS

| | | |
|---|---|---|
| DE | 2825039 A1 | 12/1978 |
| DE | 3116778 A | 2/1982 |
| EP | 0900589 A1 | 3/1999 |
| EP | 1743879 A2 | 1/2007 |
| GB | 1462633 A | 1/1977 |
| JP | S53-92715 A | 8/1978 |
| JP | S54-16427 A | 2/1979 |
| JP | S 63-130132 A | 6/1988 |
| JP | H11-137988 A | 5/1999 |
| JP | 2007-022934 A | 2/2007 |
| WO | 2005032696 A | 4/2005 |
| WO | 2010/060535 A | 6/2010 |
| WO | 2013165245 A | 11/2013 |
| WO | 2018/078074 A1 | 5/2018 |

OTHER PUBLICATIONS

From urea- to UAS- to multiproduct-granulation, Document of the 13th Stamicarbon Urea Symposium, Rotterdam, Netherlands.
Simplified granulation process now in successful operation, Document of the 13th Stamicarbon Urea Symposium, Rotterdam, Netherlands.
Dirkx et al., "Finishing touches", World Fertilizer magazine.
C.M. Munoz et al., "Urea Synthesis, Properties and Uses", Chemical Engineering Methods and Technology, Chapter 1 "Production of Granular Urea as Nitrogenous Fertilizer".
W. Roos, Urea Granulation—Part 1, Granulation of Urea: Diamonds, Pearls and Stamicarbon Granules, Fertilizer Focus.

* cited by examiner

INTERNAL COOLING SYSTEM FOR FLUID-BED GRANULATION PLANTS

CROSS REFERENCE TO RELATED APPLICATIONS

This application is a U.S. National Stage Entry of International Patent Application Serial Number PCT/EP2019/061739, filed May 7, 2019, which claims priority to European Patent Application No. EP 18171205.0, filed May 8, 2018, the entire contents of both of which are incorporated herein by reference.

FIELD

The present disclosure generally relates to a fluid-bed granulator system with an adjustable cooling setup.

BACKGROUND

Due to a continuous world population growth, there is an ongoing need in providing reliable, easy producible and cheap fertilizers. These conventional fertilizers may contain nitrogen, phosphate, sulfur, calcium, selenium, potassium or micronutrients.

A common, widely used fertilizer contains urea as its main component. The water soluble urea rapidly decomposes in the soil, providing ammonia and nitrate compounds. Based on the application, the fertilizer may contain only urea or a combination of urea with one or more of the before mentioned components, e.g. phosphate, sulfur, potassium or micronutrients.

Urea can be produced on a large industrial scale by reacting ammonia with carbon dioxide via a (simplified) two-step reaction:

$$2NH_3 + CO_2 \rightleftharpoons H_2N-COONH_4 \quad (1)$$

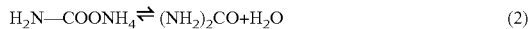

$$H_2N-COONH_4 \rightleftharpoons (NH_2)_2CO + H_2O \quad (2)$$

Post synthesis process steps are necessary in order to provide a transportable and storable urea fertilizer. Common technical processes include diverse granulation technics like prilling, drum granulation or fluid-bed granulation. Especially prilling processes suffer from some critical drawbacks like relatively soft particles and sometimes deformed inhomogeneous particles.

These problems can be avoided by using a fluid-bed granulation process, which results in harder, more stable and homogeneous granules. The resulting granular urea is particularly suitable for bulk blending operations. Furthermore, there is reduced segregation or mechanical damage during mixing and transporting of the urea based fertilizer.

Examples of fluid-bed granulation process of urea can be found in WO 2010/060535 A1, e.g. in paragraphs [0025]-[0035], FIG. 1 or in U.S. Pat. No. 4,701,353 A, DE 31 16 778 A1 and U.S. Pat. No. 4,219,589 A.

During granulation, urea fertilizers can be combined with ammonia sulfate or elemental sulfur, therefore providing both plant nutrients in one fertilizer.

The fluid-bed granulation process is based on providing granulation seeds, which grow by absorbing very small droplets of a growth liquid. These small droplets can be provided via an "atomized" liquid urea melt. The term "atomized" used within the invention refers to a mixing process of the liquid urea melt (or other suitable fertilizer melts) with a pressurized medium like air. This mixing process creates a liquid/gas emulsion or an aerosol of small droplets. The term "atomized" should therefore not be confused with a molecular separating process of atomic/covalent bonds. The produced droplets may have a medium size distribution around 1 μm to 200 μm. These small melt droplets accumulate and solidify on the surface of the granulation seeds, thereby increasing the size of the granulation particles. These fresh "in-situ" produced granules may commonly exhibit temperatures around 100° C. and are relatively soft. The particles further cool down in the fluid-bed of the granulator and/or in separate cooling equipment.

The size, size distribution, geometry and mechanical properties of the final product are highly dependent on the temperature during the granulation process. Therefore a controlled temperature environment is essential in achieving reproducible product granules with constant product properties, e.g. in regard hardness, caking or dust forming tendency.

Plants utilizing the fluid-bed granulation process rely to a large extent in the use ambient air for cooling. Therefore, the capacity of a fluid-bed granulation process may be limited depending on the temperature of the ambient air or the amount of heat that can be removed by the ambient air. This can lead to high temperatures in the plant which reduces the amount of product that can be produced or may lead to a reduction in product quality and deteriorating operating conditions. In addition, during certain operating conditions (e.g. very high product loads) the granulation temperature can get too high. This occurs mostly when operating at high capacities or high ambient temperature, or both. Furthermore, many plants are already fitted with a fluid bed cooler to reduce the granule temperature from about 95° C. to 60-70° C. This requires a lot of ambient air and can be difficult during the above mentioned operating conditions as well.

The fluidization air used in a fluid bed granulation process has two purposes, it fluidizes the particles and it is used to provide heating or cooling of the particles. Therefore a fluid bed temperature adjustment by changing the fluidization airflow is always combined with a change in the flow profile of the fluid-bed, therefore the avoiding of local "hot or cold spots" is difficult to realize. An inhomogeneous temperature profile may lead to an increased polydispersity of the final product granules, it also negatively effects the running time of the granulator.

There is an ongoing need for further improvements in regard to a reliable and reproducible temperature control in the fluid-bed granulation process, especially in warmer climate zones.

Cooling the ambient air is possible by the use of external cooling media but incurs significant economic and financial costs. The use of external cooling media is also limited by the humidity of the ambient air. Furthermore, due to the hygroscopic nature of fertilizers, cooling the air below the dew point will lead to the formation of water droplets which must be removed before the air enters the fluid-bed.

WO 2013/165245 A1 discloses a plant for the production of urea. The plant comprises conventional sections for synthesis and recovery, for evaporation and condensation, for urea finishing, and for dust scrubbing. According to the invention, an additional evaporation and condensation loop is introduced from and too the dust scrubbing section.

U.S. Pat. No. 7,582,237 B2 discloses a granulation process for preparing granular urea using a fluidized bed method or a fluidized spouted bed method. The operational temperature of the fluidized bed is controlled in a range of 110–120° C.

GB 1,462,633 A discloses a process for granulating urea using cooling procedures before or after classification.

U.S. Pat. No. 3,398,191 A discloses a process for granulating ammonia nitrate and urea.

U.S. Pat. No. 4,353,730 A discloses a process for granulating urea by providing a plurality of spouted bed granulation zones. The entrained fine solid particles are separated, cooled and recycled as priming granules to the spouted bed granulation zones.

U.S. Pat. No. 5,779,945 A discloses a process for producing granules from a liquid material by applying the liquid material onto solid particles.

US 2011/0159180 A1 discloses a method for processing urea granules including a classifier for on-size, oversize and undersized particles.

U.S. Pat. No. 8,622,325 B2 discloses a process for the production of granules from a liquid composition with a decreased dust production.

U.S. Pat. No. 3,117,020 A discloses a process for granulation of urea and ammonium nitrate on a rotating plate. The amount of recycled product needs to be high in order to utilize an optimal cooling behavior. The granulated particles are directly transferred to a sieve without further processing steps.

Thus, a need exists for a fluid-bed granulator system with an adjustable cooling medium suitable in warmer climate zones (e.g. middle annual temperatures above 30° C.) and high production capacities.

Thus, a need exists for the production of urea containing fertilizer granules.

Thus, a need exists for the use of the urea plant for the production of fertilizer granules.

DETAILED DESCRIPTION

Figure 1:
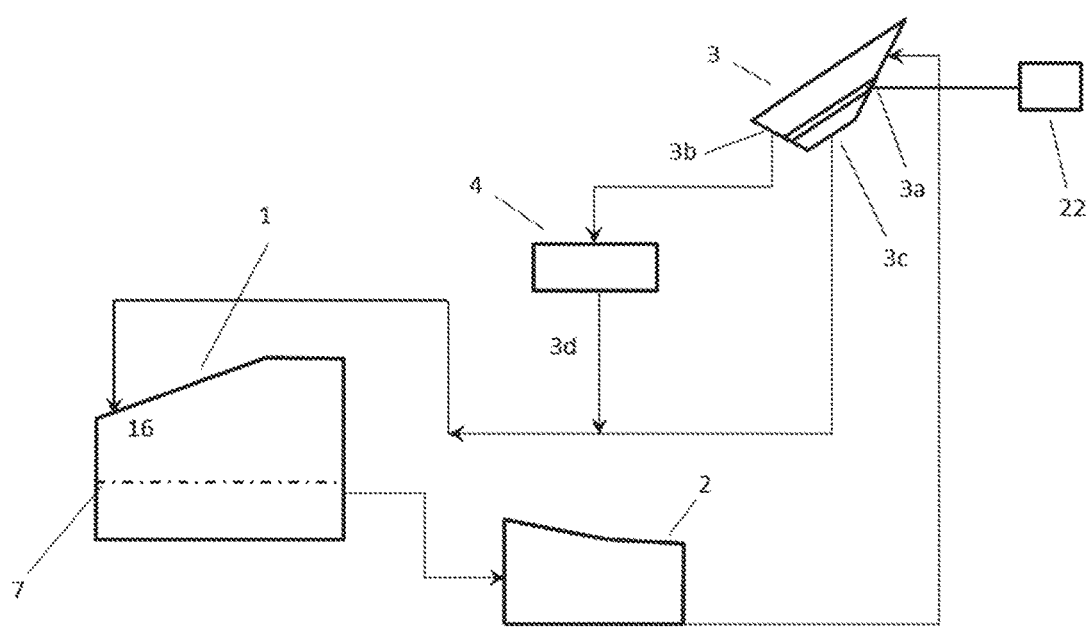
FIG. 1 is an exemplary schematic view of a fluid-bed granulator system according to the state of the art.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a fluid-bed granulator system with an adjustable cooling setup, a process for a temperature controlled granulation of urea containing particles, a urea granulation plant and a use of the fluid-bed granulator system for the production of fertilizer granules containing ammonia compounds.

The Fluid-bed granulator system with adjustable cooling setup according to the invention comprises a fluid-bed granulator and a first cooler connected with the fluid-bed granulator. Optionally, the first cooler can form a part of the fluid-bed granulator as an internal cooling section. The first cooler is necessary to avoid sticking of the freshly produced warm particles on a product screen or sieve. The principle setup of a fluid-bed granulator is well known in the art. Examples of fluid-bed granulation process of urea can be found in WO 2010/060535 A1, e.g. in paragraphs [0025]-[0035], FIG. 1 or in U.S. Pat. No. 4,701,353 A, DE 31 16 778 A1 and U.S. Pat. No. 4,219,589 A. The term "connected" within the meaning of the invention generally refers to connection means which are able/suitable to transport or transfer process liquids, solids or gases and/or mixtures thereof, e.g. via pipes, ducts, pumps, hoses and further includes tanks, reservoirs and/or pumps. This definition includes connection means suitable for low pressure gaseous, solid and liquid mediums (below 1 bar) and high pressure (above 1 bar) gaseous, solid and liquid mediums and mixtures thereof. A product screen is connected with the first cooler. The product screen (or sieve) separates the granular particles from the product cooler into product particles within the desired product size "on-size" (e.g. between 2 mm and 4 mm) and into oversized (above the desired product size) and undersized (below the desired product size) particles. This particle size separation and selection can be achieved e.g. by the use of different screens with a decreasing mesh size. Preferably, a minimum screen setup would include a first screen with a mesh size above the desired particle size and a second screen below the desired particle size, thus dividing the product screen into three parts. Within the meaning of the invention, the term "above the desired particle size" preferably refers to mesh size slightly above the upper limit of the desired particle size (e.g. above 4 mm) and below the lower limit of the oversized particles. The actual mesh size may therefore vary e.g. in a range of 5% to 25% in dependence of the before mentioned particle size. Within the meaning of the invention, the term "below the desired particle size" preferably refers to mesh size slightly below the lower limit of the desired particle size (e.g. below 2 mm) and above the upper limit of the undersized particles. The actual mesh size may therefore vary e.g. in a range of 5% to 25% in dependence of the before mentioned particle size. The number of screens may vary with the plant capacity. The product screen further comprises an exit for final product particles, e.g. between the first screen and second screen, an exit for oversized particles, e.g. above the first screen, and an exit for undersized particles, e.g. below the second screen. The exit for the undersized particles is connected with the fluid-bed granulator and the exit for oversized particles is connected with the fluid-bed granulator via a crusher or a similar device for reducing the particle size. The exit for the final on-size product particles is connected to (suitable) further processing units like coolers, belt conveyors, scales and packaging devices.

According to the present invention, a recycle cooler is located and connected between the exit for undersized particles of the product screen and the fluid-bed granulator via recycle inlets, thereby effectively cooling the undersized particles before entering the fluid-bed granulator as new seed particles. The additional recycle cooler reduces the temperature of the respective granular particles, preferably resulting in undersized particles entering the fluid-bed granulator with a temperature between 45° C. to 80° C. The undersized particles thereby effectively cool the fluid-bed granulator. Alternatively or additionally, the recycle cooler is located and connected between the exit(s) of the oversized particles and the fluid-bed granulator via recycle inlets. Thereby the recycle cooler may be located (in the direction of flow) before or after the crusher. The undersized particles and/or crushed oversized particles enter the fluid-bed granulator on one or more, preferably two, three, four or five, different recycling inlets or are distributed to different recycling inlets within the fluid-bed granulator. The additional recycle cooler or recycle coolers can be installed in such a way that the material from any number of screens can be cooled.

Technologies for the urea fluid-bed granulation plants exhibit a recycle stream whereby over- and under-size material is returned to the fluid-bed granulator where it is utilized as seed material for the granulation process (c.f. U.S. Pat. No. 8,622,325 B2). The recycle material has a lower temperature than the fluid-bed granulator material. The flow of this material can be preferably up to 50% of the plant production rate and the feed point to the granulator must be selected with care. If the amount of recycle material into one section of the granulator is too high it will significantly affect the heat balance and reduce the fluid bed temperature in that area of the granulator. This again will affect the performance and the product quality. It is therefore beneficial to split this recycle flow and feed it to different sections (recycle inlets) of the granulator. This reduces the disturbance of the granulator temperature profile and the granulation process. The cooling effect of the recycle material can be increased by providing the additional recycling cooling to the recycle stream. The recycle stream originates from the product screens. As mentioned before, it consists of material which is larger than the product specification ("oversize") and the material that is smaller than the product specification ("undersize"). Normally the amount of oversize material is smaller than the amount of undersize material. Therefore, the preferred method is to cool the undersized particles (lower-size material), however the over-size material can also be cooled.

By using a recycle distribution system and an additional cooling of the recycle material, it is possible to optimize the temperature profile inside the fluid bed granulator. As this cooling is independent of the ambient air temperature, it can be utilized for maintaining the required temperature profile during periods of high ambient air temperatures or for increasing the operating capacity of the fluid bed plant. Preferably, the Fluid-bed granulator system allows a recycle ratio defined as the sum of the mass (m) of crushed particles ($3d$) plus the mass of undersized particles ($3c$) divided through the mass of final on-size product particles ($3a$) expressed as $[m(3d)+m(3c)]/m(3a)$ is below 1. Therefore, the amount of particles kept in the recycle loop is lower than the total granulator output. However, temperature control of the particles in the recycle loop is much easier (e.g. with granulation systems utilizing a rotating drum) than the temperature control of particles leaving the granulation system.

The recycle cooler is connected with the fluid-bed granulator via one or more recycle inlets, more preferably two or more recycle inlets. To achieve an optimum temperature profile in the granulator the recycle material (e.g. undersized particles and/or oversized crushed particles) can be distributed in such a way that it enters the granulator at various positions. For small plants the recycle inlets are located in the first section of the granulator, larger plants require that the recycle material is distributed to additional recycle inlets located along the longitudinal axis of the granulator. The inlets are positioned so that the temperature profile inside the granulator remains in the optimal range.

Preferably, the Fluid-bed granulator comprises a granulator space inside the fluid-bed granulator. The fluid-bed granulator further comprises a perforated plate located inside the granulator space and spray nozzles located in, on or beside the perforated plate. Preferably, the spray nozzles are attached to the perforated plate. A fluidization air inlet, preferably located below the perforated plate, provides the necessary fluidization air for the fluid bed of fertilizer granules. The term "fluidization air" includes air or inert gases like $CO_2$, nitrogen, argon or mixtures thereof. The spray nozzles are connected with supply lines for atomization air and supply lines for a liquid melt, preferably a liquid melt containing urea. Within the meaning of the invention, the term "melt" include salt melts and concentrated salt solution and mixtures thereof, preferably solutions containing more than 50 wt. % salt. Optionally, these supply lines for air and melt can be combined in one line. In addition, the fluid-bed granulator comprises a granulation seeds inlet. The term "a granulation seeds inlet" comprises internal and/or external devices, lines and openings for the introduction of granular seeds. The term "internal" refers to the production of granular seeds within the granulator. The term "external" refers to the providing provision or production of granular seeds from outside the granulator, e.g. via sieves or crushers outside the fluid-bed granulator. Furthermore, the fluid-bed granulator comprises a granulator outlet opening and an air vent opening. Optionally, the granulator space comprises separating walls with optionally integrated openings. These separating walls may further alter and modify the speed of the fluid bed towards the granulator outlet opening. Dust, e.g. urea dust, and chemical vapors like ammonia, which are created or released during the granulation process, are removed in a separate scrubber unit. Preferably, the scrubber unit comprises at least a dust removing scrubber and an ammonia removing scrubber. Examples of suitable scrubbers can be found in WO 2005/032696 A1 (FIG. 1) or WO2010/60535 A1.

Preferably, the fluid-bed granulation system comprises at least a first cooler with a cooler space inside the first (preferably fluid-bed) cooler and a perforated plate located inside the cooler space. A fluidization air inlet, preferably located below the perforated plate, provides the necessary fluidization air for the fluid bed of fertilizer granules. The fertilizer granules are conveyed into the first cooler via a product inlet. The cooled fertilizer granules leave the first (fluid-bed) cooler via a cooler outlet opening. Furthermore, the first (fluid-bed) cooler comprises an air vent opening. Dust, e.g. urea dust, and chemical vapors like ammonia, which are created or released during the cooling process, are removed in a separate scrubber unit via the air vent opening. Preferably, the scrubber unit comprises at least a dust removing scrubber.

In a preferred embodiment, the recycle cooler uses air or water as cooling medium.

Preferably, the recycle cooler comprises a so-called bulk flow cooler. A bulk flow cooler consists of vertical passageways through which the product flows. The passage ways are formed by metal plates or tubes which are cooled with cooling water. Such devices are well known and proven in the industry.

Preferably, the perforated plate comprises (in the direction of the granular flow) at least a growing zone and a cooling zone, more preferably (in the direction of flow) at least a first growing zone, a first cooling zone, a second growing zone and a second cooling zone.

The term "growing zone" refers to a section of the perforated plate inside the fluid-bed granulator. The growing zone marks a section, wherein the particle size and weight is increased, e.g. due absorbing urea droplets. The term "cooling zone" refers to another section of the perforated plate inside the fluid-bed granulator. The cooling zone marks a section, wherein the particle size and weight is kept relatively constant and wherein the temperature of the particles is reduced. The combination of cooling and growing zones supports the temperature control of the fluid-bed and helps to prevent the overheating of the particles. Preferably, the cooling zone does not comprise spray nozzles. Optionally, different cooling and growing zones may also be located next to each other.

In a further preferred embodiment, the recycle cooler(s) is/are connected (in regard to the oversized particles: via the crusher) with a growing zone and/or a cooling zone of the fluid-bed granulator. The cooled undersized or crushed particles are distributed via a number of inlets along the longitudinal axis of the respective growing or cooling zone. This connection set-up as described above allows a selective cooling of the fluid-bed independent of the ambient air temperature or the level of the production capacity. More preferably, the recycle cooler is connected (via respective inlets) with the first growing zone and/or the second growing zone. The connection to the respective granulation zones can be realized via suitable inlets and connection means, e.g. pumps, tubes, etc. . . . . Preferably all growing zones are connected with the recycle cooler via the before mentioned inlets, more preferably via adjustable recycle inlets ($16_i$). Depending on the overall product quality, the cooled particles can be selectively added to the first, second, third and/or respective growing zone. Therefore, the adjustable inlet can be used to control the product quality in the respective growing zones.

Preferably, the growing zone and the cooling zone are separated with partition walls, adding further means for temperature and flow control.

In a preferred embodiment, the all growing zones are connected with the recycle cooler via the recycle inlets, preferably via adjustable recycle inlets. This setup allows a very advanced temperature control.

A further aspect of the invention comprises a process for a temperature controlled granulation of urea containing particles. In a first step, seed granules are introduced into a fluid-bed granulator followed by a granulating of said seed granules and receiving product granules. These said product granules are conveyed/transferred to a first cooler, preferably a fluid-bed cooler, resulting in pre-cooled product granules. Optionally, the first cooler can form a part of the fluid-bed granulator as an internal cooling section. The pre-cooled product granules are conveyed into a product screen resulting in final product particles, oversized particles and undersized particles. The product screen (or sieve) separates the granular particles obtained from the product cooler into product particles "on-size" within the desired product size, oversized (above the desired product size) and undersized (below the desired product size) particles. This particle size separation and selection can be achieved e.g. by the use of different screens with a decreasing mesh size. Preferably, a minimum screen setup would include a first screen with a mesh size above the desired particle size and a second screen below the desired particle size, thus dividing the product screen into three parts. Subsequently, the undersized particles are conveyed into the fluid-bed granulator forming new seed particles for the granulation process and homogeneously lowering the temperature in the fluid-bed. Therefore, the undersized particles act as a cooling medium, too. Simultaneously the final product particles are removed to post granulation processes like scaling and packaging. The oversized particles are conveyed into a crusher resulting in crushed, therefore undersized, particles, which are conveyed back into the fluid-bed granulator, preferably together with the before mentioned undersized particles. The inventive process comprises the transfer of the undersized and/or oversized crushed particles into a recycle cooler(s) before entering the fluid-bed granulator. The undersized or crushed particles thereby effectively cool the fluid-bed granulator without significantly affecting the flow dynamics of the fluid-bed.

Preferably, the temperature of the granulation step is kept in a range of between 102° C. and 112° C. This temperature range results in a high productivity of the granulation process and low amounts of defective urea containing granules.

The perforated plate used in the inventive process comprises in another preferred embodiment (in the direction of flow) at least a first growing zone and a first cooling zone. More preferably, additionally a second growing zone and a second cooling zone. Depending on the size of the fluid-bed granulator, third, fourth or fifth (and so on) growing and cooling zones may be additionally present.

Preferably, the undersized particles and/or the crushed particles are conveyed into the first growing zone and/or the first cooling zone. More preferably, the undersized particles and/or the crushed particles are conveyed into the first growing zone and/or the second growing zone and/or third growing zone and/or fourth growing zone (and so on). Depending on the ambient temperature or the production capacity, the selective introduction of the cooled undersized particles and/or the crushed particles allows a specific temperature reduction in the selected areas of the fluid-bed granulator.

Preferably, the amount of final on-size product particles is in the range between 500 t/d (tons per day) and 4000 t/d (tons per day). This huge amount of granular particles requires a special cooling setup, especially if the outside temperature varies significantly.

Preferably, a recycle ratio defined as the sum of the mass of crushed particles ($3d$) plus the mass of undersized particles ($3c$) divided through the mass of final on-size product particles ($3a$) expressed as $[m(3d)+m(3c)]/m(3a)$ is below 1. Therefore, the amount of particles kept in the recycle loop is lower than the total granulator output.

The invention further comprises a urea granulation plant comprising an inventive fluid-bed granulator system as described above.

The invention further comprises an inventive fluid-bed granulator system as previously described for the production of fertilizer granules containing ammonia compounds, nitrates, phosphates, urea, elemental sulfur, ammonia sulfate, UAS (urea-ammonia sulfate), and/or mixtures thereof.

The invention is further described in the following examples. The examples do not limit the scope of protection.

EXAMPLE 1

Example 1 comprises a urea granulation plant with a setup as described in FIG. 1 with a urea output of 3,850 t/day and a varying ambient air temperature of 34° C. or 42° C. The temperature in 4 different growing zones (Zones 1, 2, 3 and 4 in the direction of granular flow) of the fluid-bed granulator is shown in table 1, indicated as Test run No. 1 and Test run No. 2. Each growing zone can be feed by a separate recycle inlet (16)

EXAMPLE 2

Figure 2:
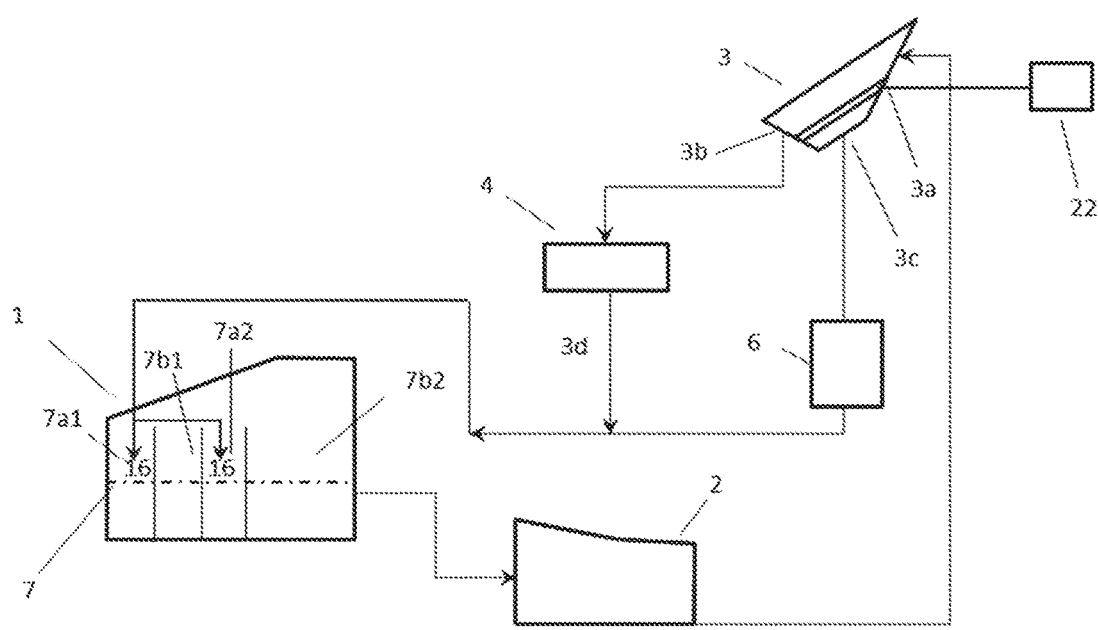
FIG. 2 is a schematic view of a fluid-bed granulator system.

A urea granulation plant with a setup as described in FIG. 2 with a urea output of 3,850 t/day and an ambient air temperature of 42° C. The temperature in 4 different zones (Zones 1, 2, 3 and 4 in the direction of flow) of the fluid-bed granulator is shown in table 1, indicated as Test run No. 3. Each zone can be feed by a separate recycle inlet (16).

TABLE 1

| Zone | % of Recycle | ° C. | % of Recycle | ° C. | % of Recycle | ° C. |
|---|---|---|---|---|---|---|
| Test run No. 1 ambient air: 34° C. Plant setup: Example 1 | | | | | | |
| 1 | 100.0 | 77 | 60 | 104 | 50 | 110.7 |
| 2 | 0.0 | 118 | 40 | 104 | 30 | 111.5 |
| 3 | 0.0 | 104 | 0 | 104 | 10 | 98.8 |
| 4 | 0.0 | 104 | 0 | 104 | 10 | 98.8 |
| Test run No. 2 ambient air: 42° C. Plant setup: Example 1 | | | | | | |
| 1 | 100.0 | 85.0 | 60.0 | 112.1 | 50 | 118.9 |
| 2 | 0.0 | 142.6 | 40.0 | 112.1 | 30 | 119.7 |
| 3 | 0.0 | 112.1 | 0.0 | 112.1 | 10 | 107.0 |
| 4 | 0.0 | 112.1 | 0.0 | 112.1 | 10 | 107.0 |
| Test run No. 3 ambient air: 42° C. Plant setup: Example 2 | | | | | | |
| 1 | — | — | 60.0 | 105.8 | 50 | 116.2 |
| 2 | — | — | 40.0 | 107.4 | 30 | 106.2 |
| 3 | — | — | 0.0 | 112.1 | 10 | 106.2 |
| 4 | — | — | 0.0 | 112.1 | 10 | 100.6 |

Table 1 shows the temperature in the different granulator growing zones 1 to 4 in dependence of the plant setup, ambient air temperature and different recycle loads in the partial sections (Zone 1, 2, 3 and 4 in the direction of granular flow) of the perforated plate in the fluid-bed granulator. Test run No. 1 at an ambient temperature of 34° C. shows a low temperature profile. The temperature in the different growing zones 1 to 4 can be adjusted by adding different amounts of recycled seed material (% of Recycle) in the different growing zones. The measured temperatures increase significantly if the ambient temperature rises to 42° C. in Test run No. 2. To avoid this temperature increase, especially above 120° C., the output of the granulation plant has to be reduced. Otherwise the high temperatures would lead to a decreased mechanical (hardness, cracking-tendency, dust forming) and chemical (urea side-products like biruet) product quality.

On the other hand, a setup according to the present invention in Test run No. 3 allows a significant adjustment and reduction of the temperature in the different granulator growing zones (Zone 1, 2, 3 and 4). This temperature decrease avoids an otherwise necessary reduction of the fluid-bed granulator output, allowing a high product output and quality even at high ambient temperatures.

FIG. 1 shows an exemplary schematic view of a fluid-bed granulator system according to the state of the art. The Fluid-bed granulator system comprises a fluid-bed granulator (1) and a first cooler (2) connected with the fluid-bed granulator (1). The term "connected" within the meaning of the invention generally refers to connection means which are able/suitable to transport or transfer process liquids, solids or gases and/or mixtures thereof, e.g. pipes, ducts, pumps, hoses and further includes tanks, reservoirs and/or pumps. This definition includes connection means suitable for low pressure gaseous, solids and liquid mediums (below 1 bar) and high pressure (above 1 bar, preferably above 10 bar) gaseous, solid and liquid mediums. A product screen (3) is connected with the first cooler (2). The product screen (3) (or sieve) separates the granular particles from the product cooler into on-size product particles (3a) within the desired product size and into oversized (above the desired product size) particles (3b) and undersized (below the desired product size) particles (3c). The minimum screen (3) setup would include a first screen with a mesh size above the desired particle size and a second screen below the desired particle size, thus dividing the product screen into three parts. The product screen further comprises an exit for final on-size product particles (3a), between the first screen and second screen, an exit for oversized particles (3b), e.g. above the first screen, and an exit for undersized particles (3c), below the second screen. The exit for the undersized particles (3a) is connected (via the recycle inlet (16)) with the fluid-bed granulator (1) and the exit for oversized particles (3b) is connected with the granulator (1) via a crusher (4) or a similar device, resulting in crushed particles (3d). The final on-size product particles (3a) are transferred to suitable further processing units (22) like scales and packaging devices.

FIG. 2 shows a schematic view of a fluid-bed granulator system according to the invention. The principle setup is identical with the setup described in FIG. 1. According to the present invention, a recycle cooler (6) is located between the exit for undersized particles (3c) and the fluid-bed granulator (1), thereby effectively cooling the undersized particles (3c) before entering the fluid-bed granulator (1) as new seed particles. This recycle cooler (6) effectively reduces the temperature of the respective granular particles, preferably by conveying undersized particles (3c) to the fluid-bed granulator with a temperature between 45° C. to 80° C. The undersized particles (3c) thereby effectively cool the fluid-bed granulator without significantly altering the process performance. The undersized particles enter and are distributed in the fluid-bed granulator on one or more different spots via the recycle inlets (16), e.g. the first growing zone (7a1) and the second growing zone (7a2).

Figure 3:
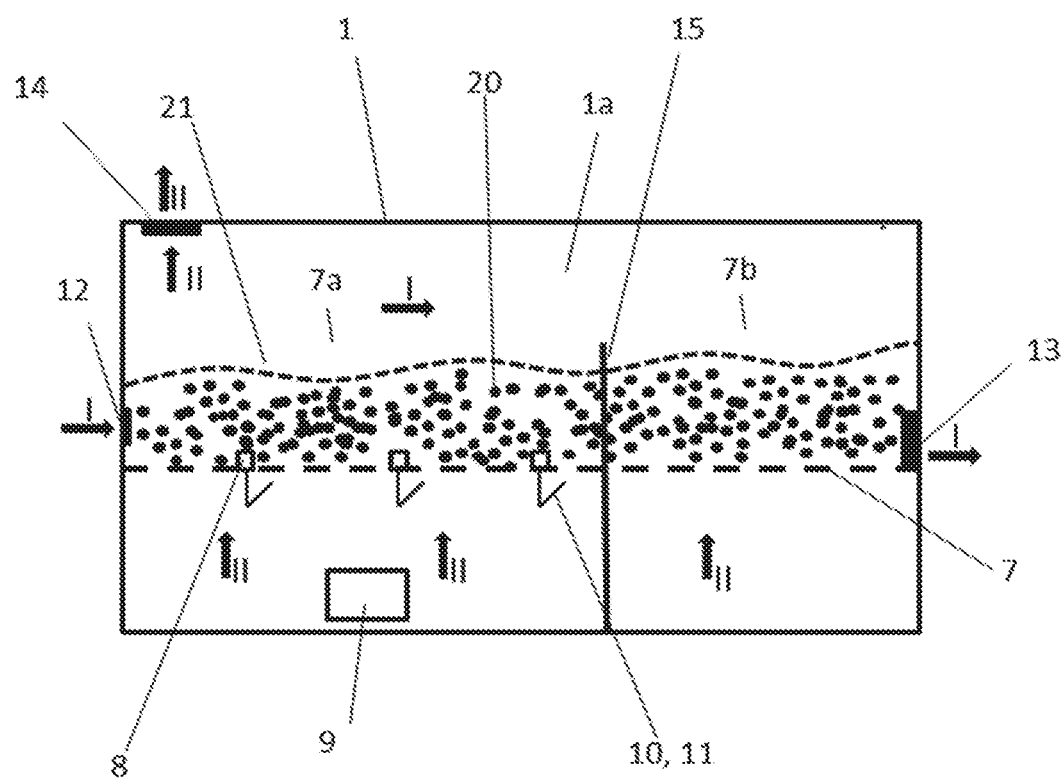
FIG. 3 is a schematic view of a fluid-bed granulator.

FIG. 3 shows a schematic view of a fluid-bed granulator according to the invention. FIG. 3 shows the schematic view of the fluid-bed granulator system according to the invention comprising a fluid bed granulator (1) with a granulator space (1a) inside the fluid-bed granulator (1). A perforated plate (7) is located inside the granulator space (1a). Spray nozzles (8) are located on or above the perforated plate (7), a fluidization air inlet (9) is located below the perforated plate (2). Multiple supply lines for atomization air (10) and supply lines for a liquid melt (11) are connected to the spray nozzles (8). Optionally, these supply lines (10, 11) can be combined in one line. The fluid-bed granulator (1) further comprises a granulation seeds inlet (12), preferably in connection with a not shown product sieve or crusher, a granulator outlet opening (13) and an air vent opening (14). The fluid-bed (21) is formed by the corresponding granular particles (20) utilizing the fluidization air from below the perforated plate (7). The fluidization air flow is indicated by arrows labeled (II), the flow direction of the fluid bed granular particles (20) is indicated by arrows labeled (I). The fluid-bed (21) is preferably divided by one or more partition plates (15), separating a shown growing zone (7a) and cooling zone (7b).

REFERENCE SIGNS (1) fluid-bed granulator
(1a) granulator space
(2) first cooler (3) product screen
(3a) final product on-size particles
(3b) oversized particles
(3c) undersized particles
(3d) crushed particles
(4) crusher
(6) recycle cooler
(7) perforated plate
(7a) growing zone (first 7a1, second 7a2 respectively, 7a$_i$ accordingly i=3, 4, 5, 6, . . . )
(7b) cooling zone (first 7b1, second 7b2 respectively, 7b$_i$ accordingly i=3, 4, 5, 6, . . . )
(8) spray nozzles
(9) fluidization air inlet
(10) supply lines for atomization air
(11) supply lines for a liquid melt
(12) granulation seeds inlet
(13) granulator outlet opening
(14) air vent opening
(15) partition plates
(16) recycle inlet
(20) granular particles
(21) fluid-bed
(22) processing units

What is claimed is:

1. A fluid-bed granulator system with adjustable cooling setup at least comprising:
a fluid-bed granulator,
a first cooler externally connected to the fluid-bed granulator or forming an internal part of the fluid-bed granulator,
a product screen connected to the first cooler and the fluid-bed granulator, wherein the product screen comprises an exit for final on-size product particles, an exit for oversized particles, and an exit for undersized particles, wherein the exit for the undersized particles is connected to the fluid-bed granulator and wherein the exit for the oversized particles is connected to the fluid-bed granulator via one or more crushers, and
a recycle cooler located and connected between the fluid-bed granulator and the exit for undersized particles and/or the exit for oversized particles,
wherein the recycle cooler is connected to the fluid-bed granulator via two or more recycle inlets,
wherein the fluid-bed granulator includes a granulator space inside the fluid-bed granulator, a perforated plate located inside the granulator space, spray nozzles located in, on, above or beside the perforated plate, a fluidization air inlet, supply lines for atomization air connected to the spray nozzles, supply lines for a liquid melt connected to the spray nozzles, a granulation seeds inlet, a granulator outlet opening, and an air vent opening,
wherein the perforated plate comprises, in the direction of flow, a growing zone and a cooling zone,
wherein the growing zone and the cooling zone are divided by partition walls,
wherein the growing zone is connected to the recycle cooler via the recycle inlets,
wherein the growing zone comprises a first growing zone and a second growing zone, wherein the recycle inlets comprise a first recycle inlet connected to the first growing zone and a second recycle inlet connected to the second growing zone.

2. The fluid-bed granulator system of claim 1 wherein the first cooler comprises a cooler space inside the first cooler, a perforated plate located inside the cooler space, a product inlet, a fluidization air inlet, a cooler outlet opening, and an air vent opening.

3. The fluid-bed granulator of claim 1 wherein the recycle cooler uses a gas or a liquid as cooling medium.

4. The fluid-bed granulator system of claim 1 wherein the recycle cooler comprises a bulk flow cooler.

5. The fluid-bed granulator system of claim 1 wherein the recycle cooler is connected to the growing zone and the cooling zone via the recycle inlets.

6. The fluid-bed granulator system of claim 1 wherein:
the recycle cooler is located and connected between the fluid-bed granulator and the exit for undersized particles, and
wherein the recycle cooler is located between the fluid-bed granulator and the exit for the oversized particles.

7. The fluid-bed granulator system of claim 1 wherein the cooling zone comprises a first cooling zone and a second cooling zone, wherein the spray nozzles are associated exclusively with the growing zone of the growing zone and the cooling zone.

8. The fluid-bed granulator system of claim 1 wherein one of the first and second recycle inlet is adjustable whereby delivery of particles cooled by the recycle cooler is adjustably delivered to a corresponding first and second growing zone.

9. The fluid-bed granulator system of claim 7, wherein the spray nozzles are located above the perforated plate and the fluidization air inlet is located below the perforated plate.

10. A urea granulation plant comprising a fluid-bed granulator system comprising:
a fluid-bed granulator,
a first cooler externally connected to the fluid-bed granulator or forming an internal part of the fluid-bed granulator, and
a product screen connected to the first cooler and the fluid-bed granulator, wherein the product screen comprises an exit for final on-size product particles, an exit for oversized particles, and an exit for undersized particles, wherein the exit for the undersized particles is connected to the fluid-bed granulator and wherein the exit for the oversized particles is connected to the fluid-bed granulator via one or more crushers;
wherein a recycle cooler is located and connected between the fluid-bed granulator and the exit for undersized particles and/or the exit for oversized particles,
wherein the recycle cooler is connected to the fluid-bed granulator via two or more recycle inlets,
wherein the fluid-bed granulator system further comprises a perforated plate, wherein the perforated plate comprises, in the direction of flow, a growing zone and a cooling zone, wherein the growing zone is connected to the recycle cooler via the recycle inlets, wherein the growing zone comprises a first growing zone and a second growing zone, wherein the recycle inlets comprise a first recycle inlet connected to the first growing zone and a second recycle inlet connected to the second growing zone, wherein the cooling zone comprises a first cooling zone and a second cooling zone.

11. The urea granulation plant of claim 10 wherein:
the recycle cooler is located and connected between the fluid-bed granulator and the exit for undersized particles, and
wherein the recycle cooler is located between the fluid-bed granulator and the exit for the oversized particles.

12. The urea granulation plant of claim 10, further comprising spray nozzles at the fluid-bed granulator associated exclusively with the growing zone of the growing zone and the cooling zone, wherein the spray nozzles are located above the perforated plate and the fluidization air inlet is located below the perforated plate.

13. The urea granulation plant of claim 10 wherein one of the first and second recycle inlet is adjustable whereby delivery of particles cooled by the recycle cooler is adjustably delivered to a corresponding first and second growing zone.

14. A fluid-bed granulator system with adjustable cooling setup at least comprising:
- a fluid-bed granulator;
- a first cooler externally connected to the fluid-bed granulator or forming an internal part of the fluid-bed granulator;
- a product screen connected to the first cooler and the fluid-bed granulator, wherein the product screen comprises an exit for final on-size product particles, an exit for oversized particles, and an exit for undersized particles, wherein the exit for the undersized particles is connected to the fluid-bed granulator and wherein the exit for the oversized particles is connected to the fluid-bed granulator via one or more crushers;
- a recycle cooler located and connected between the fluid-bed granulator and the exit for undersized particles, wherein the recycle cooler is connected to the fluid-bed granulator via a first recycle inlet and a second recycle inlet; and
- a perforated plate, wherein the perforated plate comprises, in a direction of flow: a growing zone and a cooling zone separated by a partition plate, wherein the growing zone comprises a first growing zone connected to the recycle cooler via the first recycle inlet, and a second growing zone connected to recycle cooler via the second recycle inlet.

* * * * *